(12) United States Patent
Beers et al.

(10) Patent No.: US 8,248,456 B2
(45) Date of Patent: Aug. 21, 2012

(54) ENDPOINTS ASSOCIATED WITH A SESSION

(75) Inventors: Ted Beers, Corvallis, OR (US); Dave Ochs, Corvallis, OR (US); Rick Mckay, Corvallis, OR (US); Bradley L. Allen, Salem, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 706 days.

(21) Appl. No.: 12/422,403

(22) Filed: Apr. 13, 2009

(65) Prior Publication Data

US 2010/0259593 A1 Oct. 14, 2010

(51) Int. Cl.
*H04N 7/14* (2006.01)

(52) U.S. Cl. ............... 348/14.09; 348/14.08; 348/14.12

(58) Field of Classification Search .... 348/14.01–14.16; 370/260–261; 709/204–205
See application file for complete search history.

(56) References Cited

U.S. PATENT DOCUMENTS

| | | | |
|---|---|---|---|
| 2002/0103864 A1* | 8/2002 | Rodman et al. | 709/204 |
| 2008/0069012 A1* | 3/2008 | Decker et al. | 370/261 |
| 2010/0085417 A1* | 4/2010 | Satyanarayanan et al. | 348/14.08 |

* cited by examiner

*Primary Examiner* — Melur Ramakrishnaiah
(74) *Attorney, Agent, or Firm* — Chun-Liang Kuo (57) ABSTRACT

A machine and method to connect endpoints associated with a session.

17 Claims, 6 Drawing Sheets

ENDPOINTS ASSOCIATED WITH A SESSION

BACKGROUND

The connecting of endpoints associated with a session conventionally involves participants from each endpoint manually connecting and initiating AV and/or data streams. Participants from each endpoint typically estimate when participants are ready to begin the session and manually configure equipment from the endpoints at the beginning of the session resulting in lost time and unexpected initiation of the session.

BRIEF DESCRIPTION OF THE DRAWINGS

Various features and advantages of the invention will be apparent from the detailed description which follows, taken in conjunction with the accompanying drawings, which together illustrate, by way of example, features of the invention and wherein.

DETAILED DESCRIPTION

The present invention differs from previous approaches by utilizing an event manager application to automatically establish muted connections with two-way muting supported endpoints and simultaneously un-muting the two-way muted supported endpoints when at least two of the endpoints are ready to join a session. Further, the present invention may utilize a shared AV processor to connect endpoints that may not support two-way muting with each other and with two-way muting supported endpoints before at least two associated endpoints are ready to join the session. A common practice for conventional connecting of endpoints associated with a session involves participants from each endpoint manually connecting and initiating AV and/or data streams. As a result, participants from each endpoint frequently guess and estimate when participants from other endpoints are ready to begin the session and manually configure equipment from the endpoints which may lead to lost time and unexpected initiations of the session. The present invention alleviates much of the burden on participants by automatically controlling the connecting, muting, and simultaneous un-muting of ready endpoints associated with the session resulting in convenience for participants. Further, user friendliness may be increased and time may be saved in not negotiating connections between associated endpoints when they are ready to join the session.

Figure 1:
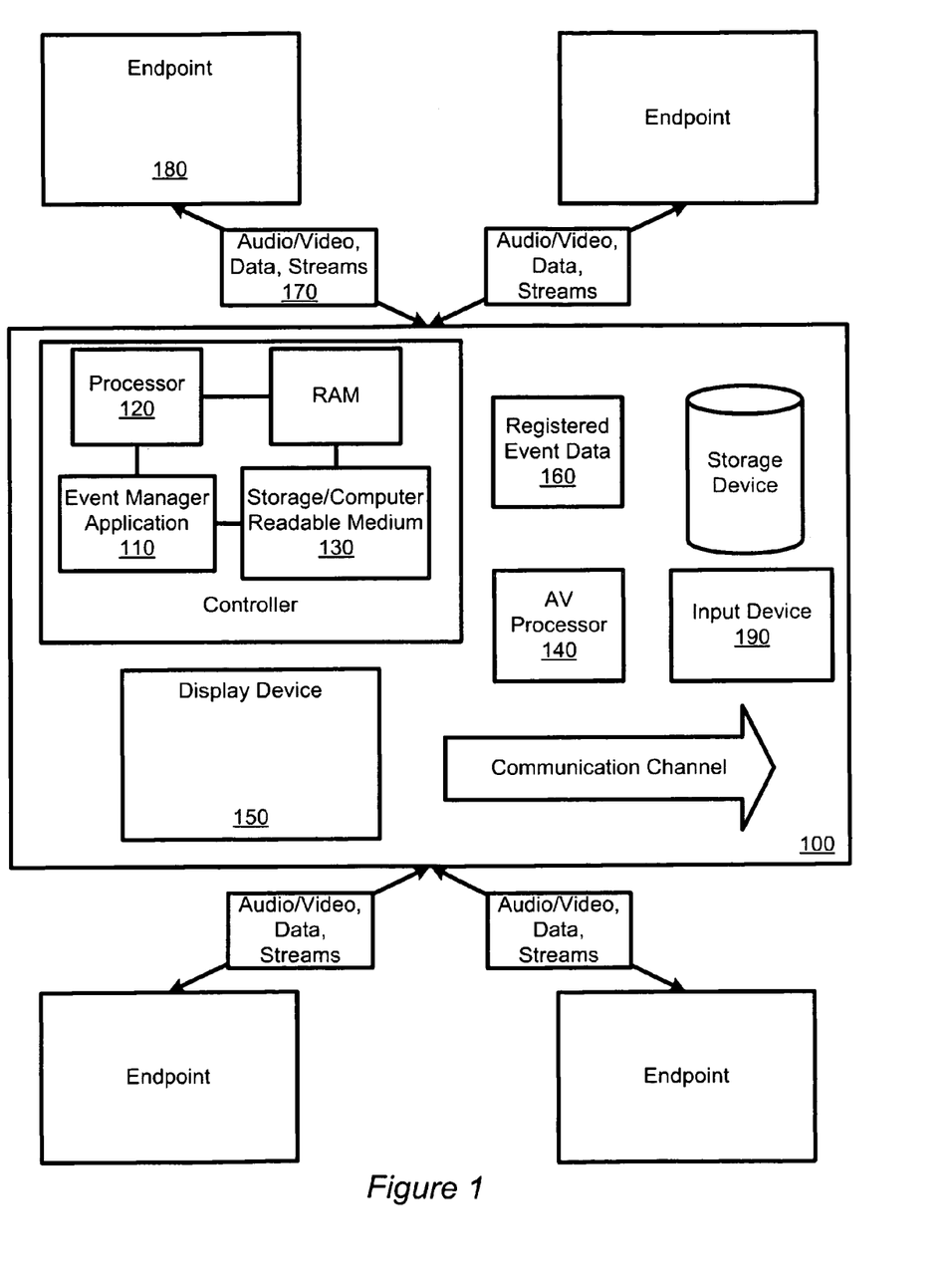
FIG. 1 illustrates a machine with an event manager application coupled to at least one endpoint according to an embodiment of the invention.

FIG. 1 illustrates a machine with an event manager application coupled to at least one endpoint according to an embodiment of the invention. The machine may be a server accessible and/or coupled to one or more endpoints in a session. In another embodiment, the machine may be an endpoint that is coupled to one or more additional endpoints associated with a session. As illustrated in FIG. 1, the machine may include an AV processor and a controller, which may further include a processor, RAM, computer readable memory, and an event manager application. The machine may further include a storage device, at least one display device, at least one input device, a controller, and one or more communication channels for the components and/or devices of the machine to communicate. The machine may include or be attached to additional device and/or components in addition to and/or in lieu of those illustrated in FIG. 1 and noted above.

As noted above, the machine may be coupled to an endpoint 180. An endpoint 180 may further include an AV processor, at least one display device, at least one input device, and/or other additional components similar to the machine 100 illustrated in FIG. 1. Additionally, the functions of an endpoint 180 and its components may be similar to machine 100 and its components. At least one endpoint 180 and/or any endpoint associated with the session may include additional components and/or devices and may be attached and/or coupled to additional devices or components in addition to and/or in lieu of those depicted in FIG. 1. Further, as noted above, an endpoint 180 may participate in the session. The session may include multiple endpoints that support a two-way muting and multiple endpoints which may not support a two-way muting.

For the purposes of this application, a two-way muting supported endpoint may be an endpoint that may establish a muted connection with an endpoint 180 and/or the machine 100 with no direct audio, video, and/or data content transmission before at least two associated endpoints are ready to join a session. In one embodiment, the muted connection may include establishing a connection with endpoints where no AV and/or data streams are shared with one another. In another embodiment, the muted connection may include the endpoints sharing dead or silent AV and/or data streams. Additionally, the muted connection may include the endpoint sharing AV and/or data streams that are muted by receiving associated endpoints.

Associated endpoints are endpoints which are listed to be associated with the same session. Each two-way muting supported endpoint may include an AV processor that may establish a muted connection. Additionally, each two-way muted supported endpoint may mute one or more AV (audio/video) streams and/or one or more data streams received from another endpoint and/or AV processor. Additionally, in another embodiment, the AV processors on each two-way supported endpoint may send one or more dead and/or silent AV streams and/or data streams. For the purposes of this application, endpoints which do not support a two-way muting are endpoints which may not establish a connection with an endpoint 180 and/or machine 100 with no direct audio, video, and/or data content transmission before at least two endpoints are ready to join the session.

Additionally, as noted above, the machine 100 may be an endpoint associated with a session and may be coupled to an endpoint 180 in the session. A session may be a meeting, video conference, presentation, and/or any additional assembly involving two or more associated endpoints sharing video, audio, and/or data. An endpoint 180 may join a session by at least one participant from an endpoint 180 declaring an intent to join the session. At least one participant may declare an intent to join the session by residing at a ready position in an endpoint 180 and/or by entering a pin with at least one input device 190 at the endpoint 180. At least one input device 190 may be a keyboard, mouse, microphone, scanner, and/or video camera that may capture one or more instructions and/or commands entered by a user.

In one embodiment, the session may be a meeting with multiple associated endpoints. Each associated endpoint may act as a video conference center, sharing and receiving AV streams and/or data streams with one another. In another embodiment, the session may be a presentation and include a participant on endpoint 180 acting as a presenter. The endpoint 180 may share AV streams and/or data streams for additional endpoints associated with the session to view and have access to. One or more AV streams may include one or more streams of audio and/or video that may be shared with each endpoint associated with the session and/or through a shared AV processor. Additionally, one or more data streams may include different forms of data and/or documents that may be utilized during the session for a presentation and shared with each associated endpoint and/or the shared AV processor. Further, at least one display device on each endpoint may render for display AV streams and/or data streams.

An AV Processor 140 is a submachine that may reside on the machine 100. Further each endpoint associated with the session may include an AV processor. Further, the AV processor 140 may generate and create still or moving images for the machine 100 and/or each associated endpoint to display on a corresponding display device on each endpoint by performing signal processing of one or more audio/video streams and/or data streams received from each associated endpoint in the session. Additionally, the AV processor 140 may send AV streams and/or data streams to the machine 100 and/or each associated endpoint.

As noted above, in one embodiment, the AV processor 140 may be a shared AV processor 140 and may be utilized by each associated endpoint which may not support two-way muting by acting as an intermediary between additional associated endpoints in the session. The shared AV Processor 140 may be controlled by the event manager application 110 and may be accessible by each associated endpoint and perform the role of the AV processors for associated endpoints which may not support a way-way muting. Additionally, the shared AV processor 140 may be utilized for receiving, processing, and sending AV streams and/or data streams for endpoints associated with the session which may not support two-way muting.

The event manager application 110 may be firmware that is embedded into the machine 100. Additionally, the event manager application 110 may be a software application stored on the machine 100 through a storage medium readable and accessible by the machine 100 or the event manager application 110 may be stored on a computer readable medium readable and accessible by the machine 100 from a different location. In another embodiment, the event manager application 110 may be stored and/or accessed through an additional endpoint 180 and/or a server coupled through a local area network or a wide area network. The event manager application 110 may communicate with the machine 100 and each endpoint associated with the session and/or other additional devices and/or components coupled to the machine 100 physically or wirelessly through one or more communication channels included in or coupled to the machine 100.

As noted above, the event manager application 110 may control the connecting and maintaining of associated endpoints before and/or during the session. In one embodiment, the event management application 110 may initially create a registered event data 160 which may list each endpoint associated with the session. The registered event data 160 may be created at a time before the session begins or when the session begins. In one embodiment, the registered event data 160 may be created when a participant from an endpoint requests to immediately establish a session with at least one endpoint. In another embodiment, the registered event data 160 may be created in advance when a user wishes to schedule the session at a future time.

The registered event data 160 may additionally list whether each associated endpoint supports a two-way muting. In one embodiment, the registered event data 160 may be created by an endpoint 180, an additional endpoint, or machine 100 accessing the event management application 110 and manually list each endpoint associated with the session. In another embodiment, an additional program may be utilized by endpoint 180 and/or a user to schedule sessions and create and/or modify the registered event data 160. Additionally, the event manager application 110 may access a universal list of endpoints which may list whether each associated endpoint supports two-way muting. Further, the registered event data 160 may include configuration settings and/or data for each associated endpoint.

Further, the event manager application 110 may identify endpoints associated with the session. In identifying endpoints, the event manager application 110 may access and scan the registered event data 160 that lists each associated endpoint. The event manager application 110 may then proceed to determine whether the associated endpoints support a two-way muting of AV streams and/or data streams. In determining whether the associated endpoints support a two-way muting, the event manager application 110 may poll the associated endpoints for a response to two-way muting support or the event manager application 110 may scan the registered event data 160 for a list of two-way muting supported endpoints for the associated endpoints.

In one embodiment, before the session begins, the event manager application 110 may poll each associated endpoint to determine whether the associated endpoints are available for connection. An endpoint may be available for connection if the endpoint is not currently connected with another endpoint and/or another session. If the associated endpoints are available, the event manager application 110 may proceed to configure the associated endpoints which support two-way muting to connect and share AV streams and/or data streams with each other before each associated endpoint joins the session. If the associated endpoints are not available, the event manager application 110 may proceed to continue to poll the unavailable associated endpoints, while concurrently configuring the associated endpoints which are available. When the unavailable associated endpoint becomes available, the event manager application 110 may proceed to configure the corresponding endpoints.

In one embodiment, the event manager application 110 may further prompt associated endpoints that may not support two-way muting to prepare for the session utilizing at least one display device and/or audio device on each corresponding endpoint and simultaneously direct a two-way un-muted connection. As noted above, a shared AV processor may be utilized by the event manager application 110 for associated endpoints which may not support two-way muting in directing a two-way un-muted connection.

In configuring each associated endpoint, the event manager application 110 may configure at least one from the group consisting of cameras, microphones, and speakers on each associated endpoints based on the registered event data 160. In addition, while proceeding to configure each associated endpoint, the event manager application 110 may proceed to establish muted connections by muting AV streams and/or data streams received from the associated endpoints that are connected and have been configured. In one embodiment, the event manager application 110 may instruct associated endpoints which may support two-way muting to mute AV streams and/or data streams received. Further, as noted above, the event manager application 110 may instruct the shared AV processor to receive and mute AV streams and/or data streams from associated endpoints participating in the session that may not support two-way muted connections.

The event manager application 110 may continue to instruct associated endpoints which support two-way muting and the shared AV processor to mute AV streams and/or data streams received from each associated endpoint until at least two of the associated endpoints are ready to join the session. While concurrently muting AV streams and/or data streams and concurrently configuring each associated endpoint, the event manager application 110 may also concurrently determine when at least two of the associated endpoints are ready to join the session.

As noted above, at least two of the associated endpoints are ready to join the session when at least two of the associated endpoints have declared an intent to join the session. Additionally, as noted above, at least one participant from each associated endpoint may declare an intent to join the session by entering a session pin that may be associated with the session. Further, at least one participant may position himself/herself at a ready position in the corresponding endpoint to declare the intent to join the session.

When at least two associated endpoints are detected to be ready to join the session, the event manager application 110 may proceed to instruct the corresponding two-way supported endpoints and/or the shared AV processor to un-mute corresponding AV streams and/or data streams simultaneously. In one embodiment, if at least two associated endpoints ready to join the session are two-way muting capable, the event manager application 110 may send an instruction for the corresponding two-way muting capable endpoints to simultaneously un-mute the corresponding AV streams and/or data streams sent to and/or received from associated endpoints. In another embodiment, if one or more of the at least two endpoints do not support two-way muting and utilize the shared AV processor 140, the event manager may send an instruction to the shared AV processor 140 and any endpoint ready to join the session which supports the two-way muting to simultaneously un-mute the corresponding AV streams and/or data streams.

The session may then have been initiated and the event manager application 110 may continue to scan each associated endpoint that has not joined the session for an intent to join the session. When one or more of the remaining associated endpoints are ready to join the session, the event manager application 110 may continue to coordinate and manage the joining of the associated endpoints with the associated endpoints already joined in the session. In one embodiment, the event manager application 110 may further continuously scan for at least one unregistered endpoint requesting to join the session and direct the joining of the unregistered endpoint into the session with the endpoints already joined utilizing one or more approach disclosed above.

In one embodiment, when at least two associated endpoints are ready to join the session and/or when at least one unregistered endpoint has requested to join the session, the even manager application 110 may notify each associated endpoints that at least two associated endpoints have declared an intent to join the session and/or that an unregistered endpoint wishes to join the session utilizing at least one display device and/or at least one audio device on the corresponding endpoints. Further, the event manager application 110 may provide each associated endpoint a status of the connection and the session utilizing at least one display device and/or at least one audio device.

Once the session has been initiated, the event manager application 110 may additionally concurrently and continuously scan the session for participants leaving or timing out and proceed to disconnect the corresponding associated endpoints leaving when participants have left the session or have not joined the session after a predefined period of time after the session initiates. Additionally, the event manager application 110 may continuously scan an end for the session and proceed to disconnect each associated endpoint in the session. In disconnecting each associated endpoint, the event manager application 110 may mute AV streams and/or data streams received from the corresponding associated endpoints and disconnect the corresponding associated endpoints from one another.

Figure 2:
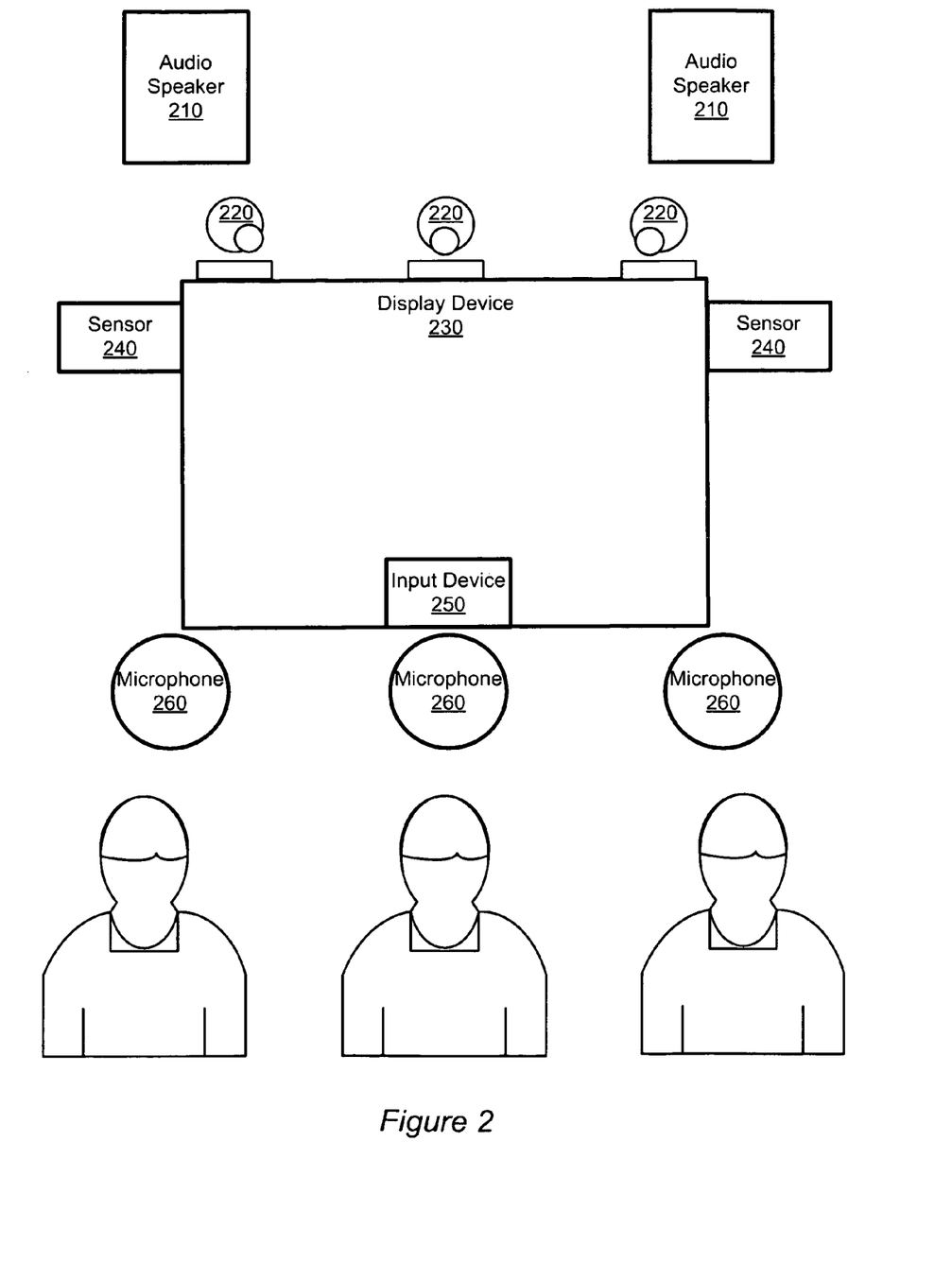
FIG. 2 illustrates an associated endpoint and various components and devices included in the associated endpoint according to an embodiment of the invention.

FIG. 2 illustrates an associated endpoint and various components and devices included in the associated endpoint according to an embodiment of the invention. As noted above, the endpoint may be associated with a session and may be two-way muting capable. Further, as illustrated in FIG. 2, the endpoint may include at least one audio speaker 210, at least one video camera 220, at least one display device 230, at least one sensor 240, at least one input device 250, and/or at least one microphone 260 which may be configured by an event manager application. Additionally, the endpoint may have one or more participants present. The endpoint may include additional devices and/or components in addition to and/or in lieu of those noted above and illustrated in FIG. 2.

As noted above, the endpoint may be associated with a session and establish a muted connection with at least one additional associated endpoint for the session. Additionally, as noted above, the endpoint may be configured for the session. In configuring the endpoint, an event manager application may utilize device settings and/or values from a registered event data to configure the devices and/or components. One or more devices and/or components that may be configured on the endpoint include, but is not limited to, at least one audio speaker 210, at least one camera 220, at least one display device 230, and/or at least one microphone 260.

Further, in one embodiment, where the endpoint supports two-way muting, the endpoint may connect with at least one associated endpoint and mute AV streams and/or data streams sent to and/or received from at least one associated endpoint. In another embodiment, where the endpoint may not support two-way muting, the endpoint may connect with a shared AV processor to send and/or receive AV streams and/or data streams. As noted above, the shared AV processor may reside on the endpoint, an additional endpoint, or a machine.

As illustrated in FIG. 2, the components and/or devices of the endpoint may be utilized and/or configured for a session. As noted above, the endpoint may include at least one audio speaker 210. At least one audio speaker 210 is an acoustic device which may be connected to an audio system or another machine on the endpoint. Additionally, at least one audio speaker 210 may emit audio, such as an audio message, from at least one AV stream before and/or during a session. An audio message may be outputted from at least one audio speaker 210 upon instruction by an event manager application instructing the participants to prepare for the session, enter a pin to declare an intent to join the session, get in a position to begin the session, a status of the connection between the endpoint and other associated endpoints, a status of the session, and a count down until the session may begin and/or end.

Additionally, as illustrated in FIG. 2, the endpoint may include at least one camera 220. At least one camera 220 may be an image capturing device that may be utilized during a session to capture images and/or video for AV streams that may be shared and utilized during the session by an event manager application. Additionally, at least one camera 220 may be used independently or in conjunction with at least one sensor 240 to detect when one or more participants are in a ready position to begin the session. Further, at least one camera 220 and/or at least one sensor 240 may be utilized individually or in conjunction to determine whether one or more participants are present at the endpoint. At least one sensor 240 may be capturing device that may capture audio, video, movement, and/or one or more participant's position upon instruction by the event manager application.

In one embodiment, the event manager application may continuously poll the associated endpoint utilizing at least one camera 220 and/or at least one sensor 240 to determine whether one or more participants have populated the associated endpoint for the session. If at least one camera 220 and/or at least one sensor 240 do not detect the presence of one or more participants after a predetermined period of time, the event manager application may determine that one or more participants may not intend to join the session and may proceed to disconnect the endpoint from additional associated endpoints in the session.

In another embodiment, as illustrated in FIG. 2, the event manager application may detect that one or more participants are present at the endpoint and proceed to prompt one or more participants to declare an intent to join the session by getting in a ready position. A ready position may be position that may be detected and recognized by at least one sensor 240 independently or in conjunction with at least one camera 220 which may be utilized by the event manager application to determine when the endpoint is ready to join the session. In one embodiment, the ready position may be in front of the video camera and sitting in a chair looking at the camera or at least one display device 230.

At least one display device 230 may be a device that may output at least one still image or moving image. Additionally, at least one display device 230 may be a monitor, a touch screen, a television, a projector, or a holographic video display. At least one display device 230 may use received AV streams and/or data streams in the video conference center to display one or more participants from another endpoint or visual information, such as a chart or data, during a session. In addition, at least one display device 230 may be utilized to display one or more messages. Similar to above, one or more messages may be outputted upon instruction by an event manager application instructing the participants to prepare for the session, enter a pin to declare an intent to join the session, get in a position to begin the session, a status of the connection between the endpoint and other endpoints in the session, a status of the session, and a count down until the session may begin or end.

As noted above, the endpoint may further include at least one input device 250. At least one input device 250 may be a mouse, keyboard, number pad, touch panel, and/or any additional device which may receive input from one or more participants at the associated endpoint. In one embodiment, as noted above, participants may declare an intent to join the session by inputting a pin utilizing at least one input device 250. In another embodiment, at least one input device 250 may be utilized by participants in the associated endpoint to share information with additional participants and/or associated endpoints joined in the session. Further, at least one input device 250 may be utilized by participants in the session to declare when they wish to leave and/or end the session.

Additionally, as noted above, the endpoint may include at least one microphone 260 that may be utilized before and/or during the session by one or more participants to detect and/or capture audio for AV streams. Further at least one microphone 260 may be utilized by the endpoint to receive commands. In one embodiment, at least one microphone 260 may be utilized to capture a spoken pin to enter the session by participants. In another embodiment, at least one microphone 260 may detect an auditory request by one or more participants to leave and/or end the session. The request may then be transferred to the event manager application to grant the request and make appropriate changes and modifications to the session and each associated endpoint.

Figure 3:
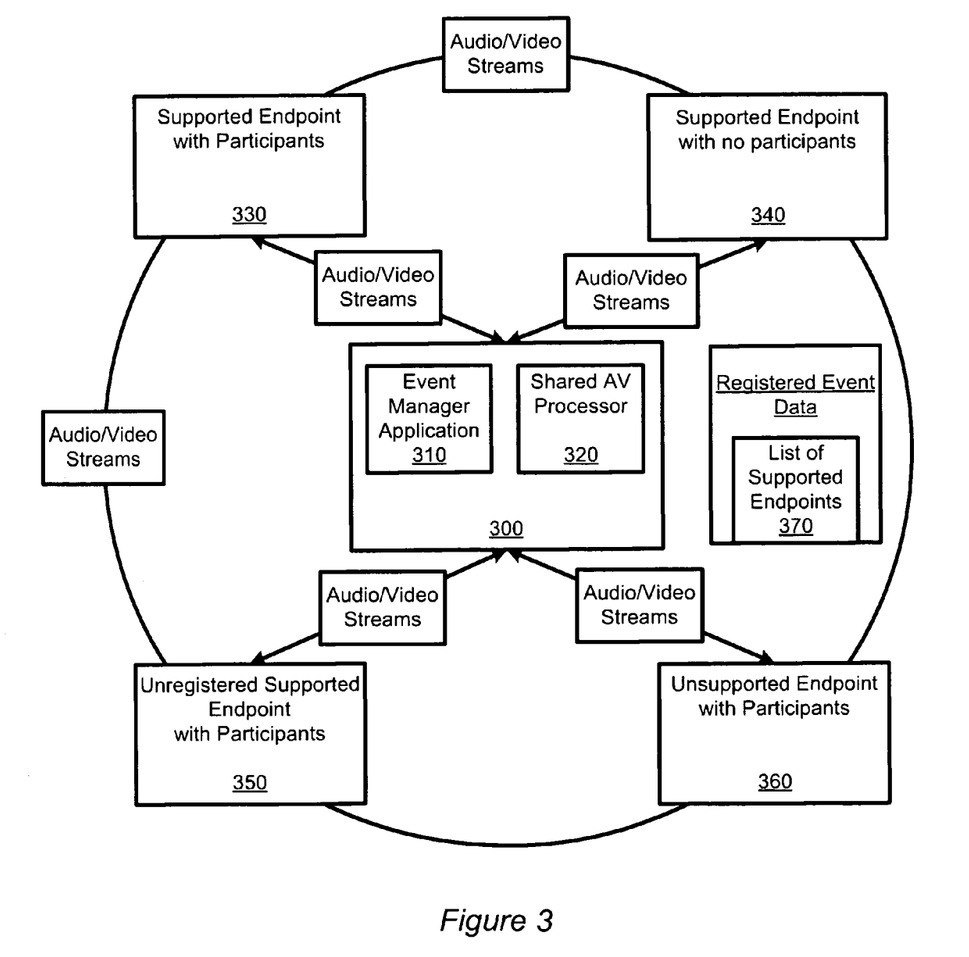
FIG. 3 illustrates a session with at least one two-way muting supported endpoint and at least one unsupported endpoint according to an embodiment of the invention.

FIG. 3 illustrates a session with at least one two-way muting supported endpoint and at least one unsupported endpoint according to an embodiment of the invention. As illustrated in FIG. 3, endpoints 330, 340, and 350 may support a two-way muting for a muted connection. Further, endpoints 330 and 340 may be listed to be associated with the session in a registered event data. Additionally, endpoint 360 may be listed to be associated with the session but may not support two-way muting.

As noted above, at least one endpoint and/or at least one participant from at least one endpoint may request a session. Additionally, as noted above, an event manager application 310 may create a registered event data which may list each endpoint associated with the session, as well as configuration settings for each associated endpoint. In one embodiment, as illustrated in FIG. 3, the registered event data may have access to a list of two-way supported endpoints 370 which may identify whether each associated endpoint supports two-way muting. In another embodiment, the event manager application 310 may poll associated endpoints 330, 340, and 360 for a response to determine whether the associated endpoints support two-way muting.

As illustrated in FIG. 3, in one embodiment, the event manager application 310 may reside on endpoint 300, which includes a shared AV processor 320. Endpoint 300 may be an endpoint associated with the session or endpoint 300 may act a server utilized to manage and maintain the session. In one embodiment, the event manager application 310 may scan the registered event data and determine that the session is scheduled to begin in 10 minutes. Additionally, the event manager application 310 may determine that endpoints 330, 340 and 360 are listed to be associated with the session. Further, the event manager application 310 may identify from the registered event data that endpoints 330 and 340 support two-way muting and endpoint 360 does not.

The event manager application 310 may proceed to instruct endpoints 330 and 340 to connect with one another and mute AV streams and/or data streams received from each associated endpoint or a shared AV processor 320. Further, the event manager application 310 may proceed to instruct unsupported endpoint 360 to connect with the shared AV processor 320 of endpoint 300. The event manager application 310 may additionally instruct the shared AV processor 320 to connect with supported endpoints 330 and 340.

The shared AV processor 320 may mute the streams from supported endpoints 330 and 340, meant for endpoint 360.

The shared AV processor 320 may additionally mute the streams from unsupported endpoint 360 which will later be shared with endpoints 330 and 340. While muting the streams, the shared AV processor 320 may proceed to feed unsupported endpoint 360 a dead or silent feed.

In one embodiment, a participant from endpoint 330 may declare an intent to join the session and the event manager application 310 may keep a record and mark that endpoint 330 is ready to join the session. Participants from unsupported endpoint 360 may further have participants declare their intent to join the session by getting in a ready position, which the event manager application 310 may keep track of. The event manager application 310 may then determine that at least two endpoints are ready to join the session and proceed to instruct endpoint 330 and the shared AV processor 320 to simultaneously each corresponding AV streams and/or data streams. Endpoint 330 may then un-mute the streams received and the shared AV processor 320 may stop feeding endpoints 360 the dead and/or silent feed and feed endpoint 360 the corresponding AV streams and/or data streams from endpoint 330.

While concurrently coordinating the un-muting of endpoint 330 and the shared AV processor 320 for endpoint 360, the event manager application 310 may determine that no participants from endpoint 340 may have been detected and that a previously defined time window to join the session has exceeded. The event manager application 310 may then proceed to disconnect endpoint 340 from each connected endpoints 330, 360, and the shared AV processor 320.

Further, in one embodiment, while waiting, polling and/or disconnecting endpoint 340, the event manager application 310 may have additionally detected that unregistered endpoint 350 wishes to join the session. Upon detection, the event manager application 310 may access the registered event data and find that unregistered endpoint 350 is not an endpoint listed to be associated for the session. The event manager application 310 may issue a message and/or a request to endpoints 330 and 360 already in the session that unregistered endpoint 350 wishes to join the session and prompt the participants to declare whether to allow unregistered endpoint 350 to join. While issuing a message and/or request to endpoints 330 and 360, the event manager application 350 may concurrently connect unregistered endpoint 350 to supported endpoint 330 and the shared AV processor 320 because both endpoints 330 and 350 support a two-way muting.

If the participants grant the request and allow unregistered endpoint 350 to join the session, the event manager application 310 may instruct endpoints 330 and 350 to simultaneously un-mute the corresponding AV streams and/or data streams with one another. Further, the event manager application 310 may instruct the shared AV processor 320 to simultaneously un-mute corresponding AV streams and/or data streams between unregistered endpoint 350 and unsupported endpoint 360. Because the two-way muting supported endpoints may already be connected, they may be rapidly and simultaneously be un-muted, upon instruction by the event manager application 310, when at least two of the endpoints are ready to join the session. As a result, the use of two-way muting on associated two-way muting supported endpoints and the inclusion of the shared AV processor 320 to connect, share, and/or receive at least one stream from and to at least one unsupported endpoint may provide convenience and save time for participants in a session.

Figure 4:
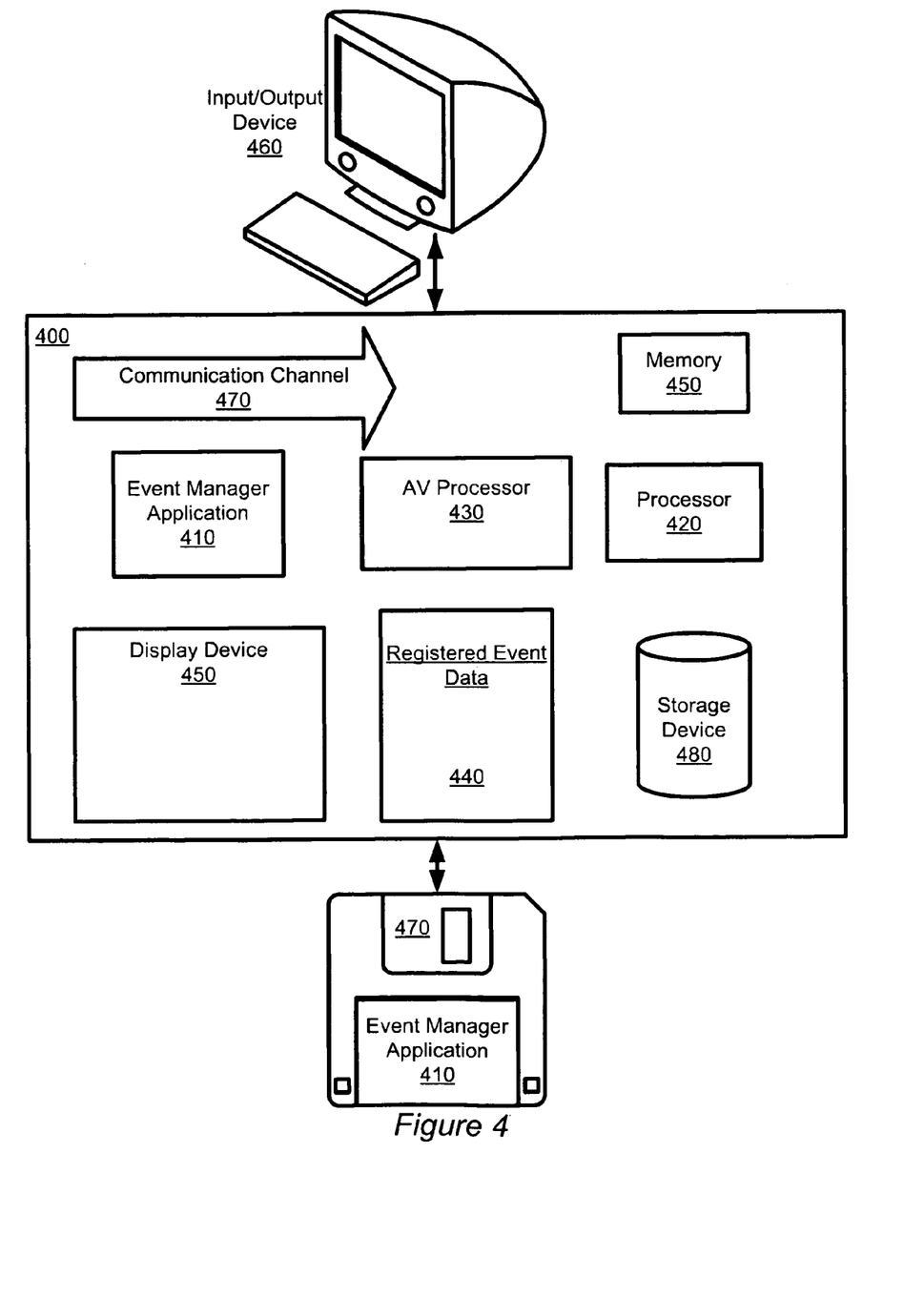
FIG. 4 illustrates an event manager application that may be embedded onto a machine and/or may be stored on a removable medium being accessed by the machine according to an embodiment of the invention.

FIG. 4 illustrates an event manager application that may be embedded onto a machine and/or may be stored on a removable medium being accessed by the machine according to an embodiment of the invention. As noted above, the machine may be an endpoint or a server. Additionally, as noted above, the event manager application 410 may control and/or manage the hardware components of machine 400 by sending instructions and/or commands to each component of machine 400 independently or in conjunction using one or more communication channels 470. The event manager application 410 may be firmware that may be imbedded into one or more components of machine 400. Additionally, the event manager application 410 may be a software application which may be stored and accessed from a hard drive, a compact disc, a flash disk, a network drive or any other form of computer readable medium that is coupled to machine 400.

In one embodiment, the media roll management application 410 may be stored on a server or another device that may or may not be connected to machine 400. Machine 400 may utilize a communication device 470 in conjunction with a local area network or a wide area network to store and access the event manager application 410. The event manager application 410 may be stored and accessed from additional devices in addition to and/or in lieu of those depicted in FIG. 4.

Reference will now be made to exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the invention as illustrated herein, which would occur to one of ordinary skill within the relevant art and having possession of this disclosure, are to be considered within the scope of the invention.

Figure 5:
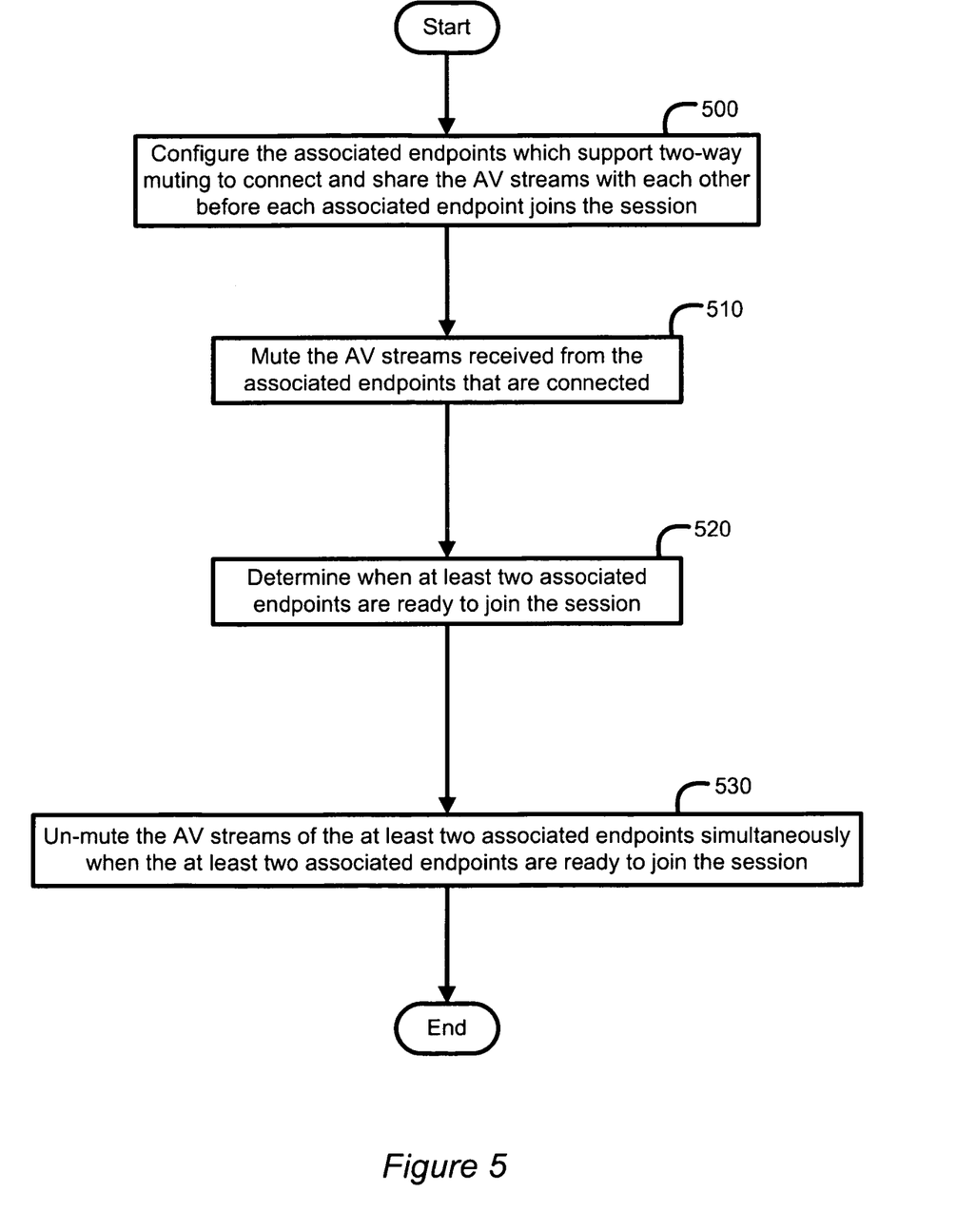
FIG. 5 is a flow chart illustrating a method for connecting endpoints associated with a session according to an embodiment of the invention.

FIG. 5 is a flow chart illustrating a method for connecting endpoints associated with a session according to an embodiment of the invention. The method of FIG. 5 may utilize at least one endpoint which may or may not support two-way muting, at least one AV processor, and an event management application. The method of FIG. 5 may utilize additional components and/or devices in addition to and/or in lieu of those noted above and illustrated in FIGS. 1, 2, 3, and 4.

As noted above, an event manager application may connect and configure associated endpoints which support a two-way muting to connect and share AV streams with each other before each associated endpoint joins the session 520. As noted above, before connecting and configuring the endpoints, the event manager application may initially identify endpoints participating in the session. After identifying the endpoints participating in the session, the event manager application may determine whether the endpoints participating support a two-way muting of AV streams. As noted above, a registered event data may be accessed or each associated endpoint may be polled to determine whether each endpoint supports two-way muting.

Before the session initiates, the event manager application may mute the AV streams received from the associated endpoints that are connected 510. The event manager application may then determine when at least two of the endpoints are ready to join the session 520. When at least two endpoints have declared an intent to join the session, the event manager application may un-mute the AV streams of the at least two of the endpoints simultaneously 530. The process may then be complete or if there are any additional associated endpoints which are not ready to join the session, the event manager application may continue to concurrently determine when the endpoints are ready to join the session and simultaneously un-mute the streams between the joining endpoint and the endpoints already joined in the session. The method of FIG. 5 may include additional steps in addition to and/or in lieu of those depicted in FIG. 5.

Figure 6:
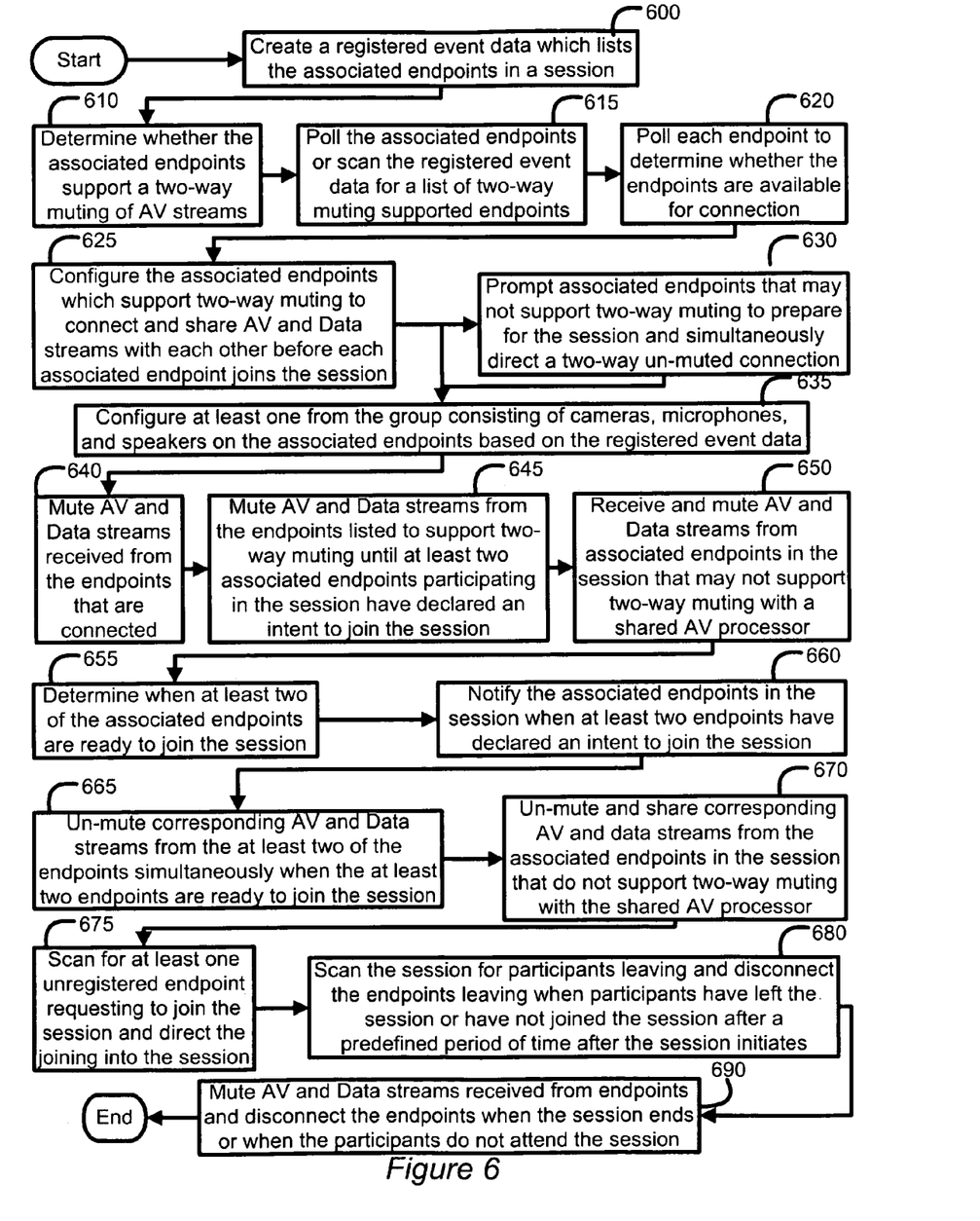
FIG. 6 is a flow chart illustrating a method for identifying endpoints associated with a session which support two-way muting, connecting associated endpoints, and un-muting corresponding AV streams and/or data streams when at least two associated endpoints are ready to join the session according to an embodiment of the invention.

FIG. 6 is a flow chart illustrating a method for identifying endpoints associated with a session which support two-way muting, connecting associated endpoints, and un-muting corresponding AV streams and/or data streams when at least two associated endpoints are ready to join the session according to an embodiment of the invention. The method of FIG. 6 may utilize at least one endpoint, an AV processor, at least one input device, at least one display device, and/or an event management application. The method of FIG. 6 may utilize additional components and/or devices in addition to and/or in lieu of those noted above and illustrated in FIGS. 1, 2, 3, and 4.

As noted above, the event manager application may create and/or manage a session with at least two endpoints. In creating the session, the event manager application may initially create a registered event data which lists the associated endpoints in a session 600. The event manager application may then proceed to determine whether the associated endpoints support a two-way muting of AV and/or data streams 610. In determining whether the associated endpoints support a two-way muting, the event manager application may poll the associated endpoints or scan the registered event data for a list of two-way muting supported endpoints 615. After identifying whether each associated endpoint supports two-way muting, the event manager application may proceed to poll each associated endpoint to determine whether the endpoints are available for connection 620. As noted above, an endpoint is available for connection if the endpoint is not currently connected in another session.

The event manager application may then utilize the registered event data to configure the associated endpoints which support the two-way muting to connect and share AV streams and/or data streams with each other before each associated endpoint joins the session 625. In one embodiment, the event manager application additionally and/or concurrently prompt the associated endpoints which may not support two-way muting to prepare for the session and simultaneously direct a two-way un-muted connection with a shared AV processor 630. The event manager application may then configure at least one from the group consisting of cameras, microphones, and speakers on the associated endpoints based on the registered event data 635.

In another embodiment, the event manager application may skip step 630 and immediately configure at least one from the group consisting of cameras, microphones, and speakers on the associated endpoints which support two-way muting based on the registered event data 635. Further, the event manager application may concurrently mute AV streams and/or data streams received from the associated endpoints that are connected 640.

In muting AV streams and/or data streams, the event manager application may instruct endpoints listed to support two-way muting to mute AV streams and/or data streams received until at least two of the associated endpoints have declared an intent to join the session 645. Further, the event manager application may additionally utilize a shared AV processor to receive and mute AV streams and/or data streams from associated endpoints participating in the session that may no support two-way muted connections 650.

While each one or more streams is being muted, the event manager application may concurrently determine when at least two of the associated endpoints are ready to join the session 655. As noted above, in one embodiment, at least two of the endpoints are ready to join the session when participants from the endpoints have declared an intent to join the session by getting in a ready position or inputting a session pin. Further, in another embodiment, the event manager application may notify the associated endpoints in the session when at least two endpoints have declared an intent to join the session using at least one display device and/or at least one audio speaker 660.

When at least two associated endpoints are ready to join the session, the event manager application may proceed to un-mute corresponding AV streams and/or data streams from the at least two of the endpoints simultaneously 665. In Un-muting corresponding streams, if each of the ready endpoints are two-way muting capable, the event manager application may instruct each ready endpoint to simultaneously un-mute each corresponding received AV stream and/or data stream. Additionally, if each of the ready endpoints are not two-way muting capable, the event manager application may further instruct the shared AV processor to simultaneously un-mute and send each corresponding stream to each ready endpoint 670.

Once the session has been initiated, the event manager application may continue to concurrently determine when additional associated endpoints are ready to join the session and facilitate the joining of the endpoints and endpoints already joined in the session. Additionally, the event manager application may concurrently scan for at least one unregistered endpoint requesting to join the session and direct the joining into the session 675. Further, the event manager application may scan the session for participants leaving and disconnect the endpoints leaving when participants have left the session or have not joined the session after a predefined period of time after the session initiates 680. In disconnecting the leaving endpoints, the event manager application may mute AV streams and/or data streams received from associated endpoints and disconnect the associated endpoints when the session ends or when the participants do not attend the session 690.

The process may then be complete or the event manager application may continue to scan for associated endpoints being ready to join the session, scan for additional unregistered endpoints requesting to join the session, and scanning for participants and/or endpoints joined in the session requesting to leave the session and repeat the method disclosed in FIG. 6. The method of FIG. 6 may include additional steps in addition to and/or in lieu of those depicted in FIG. 6.

What is claimed is:

1. A method for connecting endpoints associated with a session comprising:

configuring the associated endpoints which support a two-way muting to connect and share AV streams with each other before each associated endpoint joins the session;

muting the AV streams received from the associated endpoints that are connected;

identifying associated endpoints which do not support two-way muting and muting AV streams received from the associated endpoints with;

determining when at least two associated endpoints are ready to join the session;

un-muting the AV streams of the at least two associated endpoints simultaneously when the at least two associated endpoints are ready to join the session; and un-muting and sharing the corresponding AV streams from the associated endpoints which do not support two-way muting with the associated endpoints if at least one of the at least two associated endpoints joining the session does not support two-way muting.

2. The method for connecting endpoints associated with the session of claim 1 further comprising creating a registered event data which lists the associated endpoints in the session.

3. The method for connecting endpoints associated with the session of claim 2 wherein the associated endpoints may be determined to support the two-way muting by polling the associated endpoints or scanning the registered event data for a list of two-way muting supported endpoints.

4. The method for connecting endpoints associated with the session of claim 1 further comprising determining whether the associated endpoints are available for connection before the session begins by polling the associated endpoints to determine whether the associated endpoints are connected with another session.

5. The method for connecting endpoints associated with the session of claim 2 wherein configuring the associated endpoints includes configuring at least one from the group consisting of cameras, microphones, and speakers on the associated endpoints based on the registered event data.

6. The method for connecting endpoints associated with the session of claim 1 further comprising:
   scanning for at least one unregistered endpoint requesting to join the session; and
   directing the connection between the at least one unregistered endpoint and the associated endpoints joined in the session by:
   muting the AV streams received from the associated endpoints in the session and the at least one unregistered endpoint;
   determining when the at least one unregistered endpoint is ready to join the session; and
   un-muting the AV streams of the associated endpoints joined in the session and the at least one unregistered endpoint simultaneously when the at least one unregistered endpoints endpoint is ready to join the session.

7. The method for connecting endpoints associated with the session of claim 1 further comprising muting data streams received from the associated endpoints that are connected until the at least two of the associated endpoints are ready to join the session and un-muting the data streams of the at least two of the endpoints simultaneously when the at least two associated endpoints are ready to join the session.

8. A machine comprising:
   a processor coupled to computer readable medium accessible by the machine;
   an AV processor configured to receive and share audio and video streams from at least one endpoint;
   an event manager application executable from the computer readable medium and configured to perform the steps of:
   connecting and configuring endpoints associated with a session that are determined to support two-way muting to share AV streams with one another before each associated endpoint joins the session;
   muting the AV streams received from the associated endpoints which support two-way muting until at least two of the associated endpoints in the session have declared an intent to join the session; and
   un-muting the AV streams simultaneously on the at least two of the associated endpoints after the at least two associated endpoints have declared an intent to join the session;
   wherein the AV processor receives and mutes AV streams from the associated endpoints in the session that do no support two-way muting and un-mutes and shares the corresponding AV streams with the associated endpoints in the session when at least one of the at least two associated endpoints joining the session does not support two-way muting.

9. The machine of claim 8 further comprising at least one input device for participants to input a registered session pin when declaring the intent to join the session.

10. The machine of claim 8 further comprising sensors that may be configured to detect whether participants are at a ready position when declaring the intent to join the session.

11. The machine of claim 8 further comprising at least one display device configured to display a count down of a time remaining until the un-muting occurs or a progress of a connection between the machine and the associated endpoints when the at least two associated endpoints have declared an intent to join the session.

12. The machine of claim 8 wherein the event manager application is further configured to determine whether the associated endpoints support a two-way muting of AV streams.

13. A computer-readable program in a computer-readable medium comprising:
   an event manager application configured to connect associated endpoints which support a two-way muting and mute AV streams and data streams shared with each associated endpoint before the associated endpoints join the session;
   further wherein the event manager application is configured to un-mute the AV streams of at least two of the associated endpoints simultaneously when at least two associated endpoints are ready to join the session;
   wherein the event manager application is additionally configured to mute the AV streams and disconnect the associated endpoints when the session ends or when participants do not attend the session; and
   wherein the event manager application is additionally configured to prompt the associated endpoints that do not support two-way muting to prepare for the session an simultaneously direct a two-way un-muted connection with the associated endpoints that do support two-way muting when the associated endpoints that do not support two-way muting are ready to join the session.

14. The computer-readable program in a computer-readable medium of claim 13 wherein the event manager application is configured to utilize a shared AV processor to mute each AV stream received from the associated endpoints which may not support two-way muting.

15. The computer-readable program in a computer-readable medium of claim 13 wherein the event management application is additionally configured to instruct the shared AV processor to un-mute and share the corresponding AV stream from at least one associated endpoint which does not support two-way muting when the at least one associated endpoint is included in the at least one two endpoints declaring the intent to join the session.

16. The computer-readable program in a computer-readable medium of claim 13 wherein the event manager application is further configured to notify the associated endpoints when the at least two associated endpoints have declared an intent to join the session.

17. The computer-readable program in a computer-readable medium of claim 13 wherein the event management application is additionally configured to scan the session for participants or associated endpoints leaving the session and disconnect the associated endpoints with participants leaving when participants have left the session or have not joined the session after a predefined period of time after the session initiates.

* * * * *

UNITED STATES PATENT AND TRADEMARK OFFICE
CERTIFICATE OF CORRECTION

PATENT NO. : 8,248,456 B2
APPLICATION NO. : 12/422403
DATED : August 21, 2012
INVENTOR(S) : Ted Beers et al.

It is certified that error appears in the above-identified patent and that said Letters Patent is hereby corrected as shown below:

In column 13, line 34, in Claim 6, delete "endpoints endpoint" and insert -- endpoint --, therefor.

In column 13, line 61, in Claim 8, delete "no" and insert -- not --, therefor.

In column 14, line 34, in Claim 13, after "session" delete "an" and insert -- and --, therefor.

In column 14, line 50, in Claim 15, after "least" delete "one".

Signed and Sealed this
Nineteenth Day of February, 2013

Teresa Stanek Rea
*Acting Director of the United States Patent and Trademark Office*